(12) United States Patent
Chiang et al.

(10) Patent No.: US 8,014,481 B1
(45) Date of Patent: Sep. 6, 2011

(54) UPSTREAM DATA RECOVERY AND DATA RATE DETECTION

(75) Inventors: John M. Chiang, San Jose, CA (US); Cesar A. Johnston, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 876 days.

(21) Appl. No.: 11/938,719

(22) Filed: Nov. 12, 2007

Related U.S. Application Data

(60) Provisional application No. 60/865,556, filed on Nov. 13, 2006.

(51) Int. Cl.
*H04L 7/00* (2006.01)
(52) U.S. Cl. .......................... 375/355; 370/332
(58) Field of Classification Search .................. 370/332, 370/352, 347, 460, 522; 375/355, 371
See application file for complete search history.

(56) References Cited

U.S. PATENT DOCUMENTS

| | | | | | |
|---|---|---|---|---|---|
| 4,078,228 | A | * | 3/1978 | Miyazaki | 370/460 |
| 5,422,880 | A | * | 6/1995 | Heitkamp et al. | 370/352 |
| 6,738,364 | B1 | * | 5/2004 | Saunders | 370/332 |
| 2007/0025734 | A1 | * | 2/2007 | Oogushi et al. | 398/71 |
| 2007/0030936 | A1 | * | 2/2007 | Johnson et al. | 375/371 |
| 2008/0002977 | A1 | * | 1/2008 | Mori | 398/71 |

OTHER PUBLICATIONS

ITU-T Telecommunication Standardization Sector of ITU—G.984.4—Series G: Transmission Systems and Media, Digital Systems and Networks, Digital sections and digital line system—Optical line systems for local and access networks—Gigabit-capable Passive Optical Networks (G-PON): ONT management and control interface specification (2004).
ITU-T Telecommunication Standardization Sector of ITU—G.984.4 Amendment 1, Series G: Transmission Systems and Media, Digital Systems and Networks, Didgital sections and digital line system—Optical line systems for local and access networks—Gigabit-capable Passive Optical Networks (G-PON): ONT management and control interface specification (2005).
ITU-T Telecommunication Standardization Sector of ITU—G.984.4 Amendment 2—Series G: Transmission Systems and Media, Digital Systems and Networks, Digital sections and digital line system—Optical line systems for local and access networks—Gigabit-capable Passive Optical Networks (G-PON): ONT management and control interface specification (2006).
ITU-T Telecommunication Standardization Sector of ITU G.984.3—Series G: Transmission Systems and Media, Digital Systems and Networks, Digital sections and digital line system—Optical line systems for local and access networks—Gigabit-capable Passive Optical Networks (G-PON): Transmission convergence layer specification (2004).

(Continued)

*Primary Examiner* — David C. Payne
*Assistant Examiner* — Leon-Viet Q Nguyen

(57) ABSTRACT

In a method for recovering a data rate of an upstream transmission having rising edge transitions and falling edge transitions, an upstream transmission is coupled into a plurality of register banks, each register bank adapted to oversample the upstream transmission at a different phase offset of a clock signal. An edge transition state is determined for each of the register banks, each edge transition state corresponding to either a rising edge transition or a falling edge transition in the upstream transmission over a clock cycle. The edge transition states of the register banks are analyzed to determine a sampling point of the clock signal for sampling the upstream transmission. The upstream transmission may be transmitted through multiple data rate recovery circuits each operating at a different clock rate, for determining the optimal sampling point and the original data rate of the upstream transmission.

20 Claims, 10 Drawing Sheets

OTHER PUBLICATIONS

ITU-T Telecommunication Standardization Sector of ITU G.984.4, Series G: Transmission Systems and Media, Digital Systems and Networks, Digital sections and digital line system—Optical line systems for local and access networks, Gigabit-capable Passive Optical Networks (G-PON): ONT management and control interface specification (2004).

ITU-T Telecommunication Standardization Sector of ITU G.984.4 Amendment 1, Series G: Transmission Systems and Media, Digital Systems and Networks—Digital sections and digital line system—Optical line systems for local and access networks, Gigabit-capable Passive Optical Networks (G-PON): ONT management and control interface specification (2005).

ITU-T Telecommunication Standardization Sector of ITU G.984.4 Amendment 2, Series G: Transmission Systems and Media, Digital Systems and Networks—Digital sections and digital line system—Optical line systems for local and access networks, Gigabit-capable Passive Optical Networks (G-PON): ONT management and control interface specification (2006).

* cited by examiner

UPSTREAM DATA RECOVERY AND DATA RATE DETECTION

CROSS-REFERENCE TO RELATED APPLICATION

The present application claims the benefit of U.S. Provisional Application No. 60/865,556, entitled "UpStream Data Recovery and Rate Detection," filed on Nov. 13, 2006, which is hereby incorporated by reference herein in its entirety.

FIELD OF TECHNOLOGY

The present disclosure relates generally to communication devices, and more particularly, to techniques for recovery of a data rate from a transmitter signal.

DESCRIPTION OF THE RELATED ART

Point-to-multipoint networks such as passive optical networks (PONs) provide efficient communications (voice, data, telephony, etc.) without substantial power consumption. A typical PON for example includes an optical line termination (OLT) acting as a network-side broadcast point that communicates with multiple optical network units (ONUs) and/or optical network terminations (ONTs) on the user side of the network. An optical fiber or bundle creates the connection between the OLT and the many ONTs/ONUs, where the signals are transmitted on that fiber/bundle using passive optical components (e.g., non-electrically powered).

The downstream broadcast from the OLT to the ONUs/ONTs is achieved through a downstream frame format that sets forth various overhead and payload data for the user side of the network. In most cases, that downstream broadcast would include data for each of the ONUs/ONTs, and that data would have to be decoded to determine which data corresponds to each ONU/ONT. To effect proper operation, the downstream frame format data may include allocation of bandwidth data, ranging information, physical layer operations and maintenance data, and the like in addition to providing downstream content to the ONUs/ONTs. The OLT provides an interface between the passive optical network and the backbone network of a service provider and is responsible for managing the ONUs/ONTs through the communication of the downstream frame formats.

On the reverse path, each ONU/ONT communicates with the OLT through upstream data in the form of an upstream burst frame format, where the upstream burst for each ONU/ONT must be timed so that the OLT sees data in a timely and expected manner.

In a Gigabit PON (GPON), ITU-T recommendations 9.984 outline three requirements for ranging ONUs and ONTs on the network: (1) the maximum range of the GPON must be at least 20 km (this is the maximum differential between the farthest and the nearest ONU/ONT measured from the OLT); (2) there can be no disruption of service to any ONU/ONT other than the one performing transmission delay measurement; (3) when ranging a new ONU/ONT, the other working ONUs/ONTs must temporarily stop transmission. Assuming these conditions are met, the OLT may properly range all ONUs/ONTs on the GPON network for upstream burst transmission.

The frame length of an upstream burst transmission may be the same as the downstream frame length, at all data rates. However, the respective data rates (clock rates) for the downstream and upstream transmissions may differ. Furthermore, not only may the downstream data rate from the OLT to the ONU/ONT differ from the upstream data rate from the ONU/ONT to the OLT, each ONU or ONT may transmit in its allotted transmission window at a different data rate. In a GPON network, ONUs and ONTs may transmit at any of the following data transmission rates of 155.52, 622.08, 1244.16, and 2488.32 Mb/s, which means that the OLT must not only be able to identify the start and stop points for the data from each ONU and ONT, to properly receive the data, the OLT must determine the data rate for that transmission data.

SUMMARY OF THE DISCLOSURE

In one embodiment, a method, for recovering a data rate of an upstream transmission having rising edge transitions and falling edge transitions, that includes: a) providing the upstream transmission to a plurality of register banks, each register bank adapted to oversample the upstream transmission at a different phase offset of a clock signal; b) determining an edge transition state for each of the register banks, each edge transition state corresponding to either a rising edge transition or a falling edge transition in the upstream transmission over a clock cycle; and c) analyzing the edge transition states of the register banks to determine a sampling point of the clock signal for sampling the upstream transmission.

In another embodiment, a method for recovering a data rate for an upstream burst transmission transmitted on a passive optical network at any one of a plurality of data rates, includes a) providing the upstream burst transmission to a plurality of data rate recovery circuits, each data rate recovery circuit operating at a different clock rate and each data rate recovery circuit: i) oversampling the upstream burst transmission using multiple register banks each sampling the upstream burst transmission at a different sampling point, ii) in response to oversampling, identifying an optimal sampling point for the clock rate of the data rate recovery circuit and identifying the register bank producing the optimal sampling point, and iii) deserializing an output from the identified register bank to produce a deserialized upstream burst transmission from the data rate recovery circuit; and b) analyzing the deserialized upstream burst transmission from each of the data rate recovery circuits to identify the data rate for the upstream burst transmission.

In another embodiment, an apparatus for identifying a data rate of an upstream transmission, includes a clock signal generator capable of generating a clock signal and a phase shifted clock signal; a plurality of register banks each capable of receiving at least one of the clock signal and the phase shifted clock signal to oversample the upstream transmission at a different phase offset of the clock signal; and an edge transition detection circuit having logic circuits adapted to determine an edge transition state for each of the register banks.

In yet another embodiment, an optical network device for identifying data rates of burst transmissions transmitted in an optical network, the optical network device comprising: an optoelectronic receiver to receive the burst transmissions; and data rate recovery circuits to receive the burst transmissions from the optoelectronic receiver, wherein each data rate recovery circuit comprises a first circuit having a plurality of registers to oversample the burst transmissions at different phase points of a clock signal, a second circuit to determine edge transition states between the different phase points of the clock signal, and a third circuit to identify an optimal sampling point based on the edge transition states, wherein each data rate recovery circuit samples the burst transmissions at a different clock rate.

DETAILED DESCRIPTION

Figure 1:
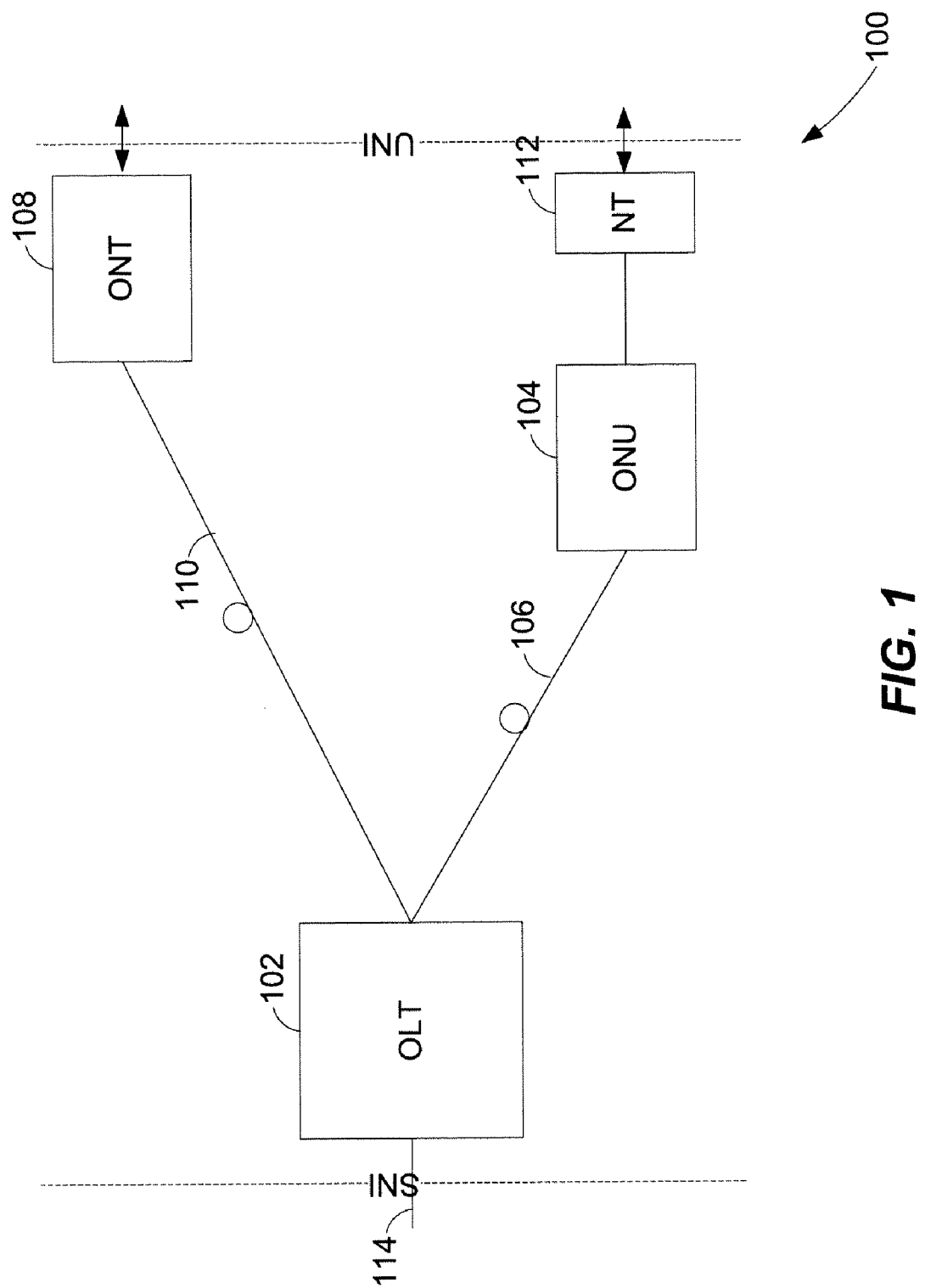
FIG. 1 a block diagram of a passive optical network.

FIG. 1 is a block diagram of an example passive optical network 100 that includes an optical line termination (OLT) 102 coupled to an optical network terminal (ONT) 108 and an optical network unit (ONU) 104. Generally, the passive optical network 100 is a point-to-multipoint network, where the OLT 102 is provided as a service node interface, for example at a server or service provider, such as an interne service provider, television service provider, telephony service provider, video/audio broadcast services, or other provider of network services. The ONT 108 and/or ONU 104 are each provided as a user node interface, for example at or near an end user. While the OLT 102 may be provided at the service provider site, the OLT 102 may also be provided as one of several OLTs within a distributed network, where each OLT is associated with corresponding ONUs and/or ONTs.

As shown in FIG. 1, the OLT 102 is communicatively coupled to the ONT 108 via an optical fiber 110, and communicatively coupled to the ONU 104 via an optical fiber 106. The optical fibers 110, 106 may be part of an optical distribution network (ODN). Although only one ONT 108 and one ONU 104 are shown to be communicatively coupled to the OLT 102, it should be understood that in a point-to-multipoint optical network, the optical fibers 110, 106 may each run, one-to-one from the OLT 102 to the ONU 104 and ONT 108 where there may be multiple ONTs and/or multiple ONUs in a passive optical network, each of which may, in turn, service multiple end users. As such, a single OLT 102 may service multiple end users on the same or a few optical fibers. As is understood, both the ONT 108 and the ONU 104 operate to terminate the passive optical network 100. An ONT 108 may refer to an integrated unit for an end user that presents the services of the service provider to the end user (e.g., video, data, telephony, etc.). An ONU 104 may be an optoelectronic interface to network termination (NT) equipment 112, where the ONU 104 terminates the passive optical network and the NT equipment 112 provides the services to the end user. The ONU 104 handles data packet conversion between the passive optical network 100 and the NT equipment 112, and the NT equipment 112 may provide an interface to the end user. While this disclosure references both ONTs and ONUs, it should be understood that in the context of this disclosure, ONTs and ONUs may be treated similarly and these terms may be used interchangeably with optical network terminal generally referring to both ONTs and ONUs. Furthermore, the term optical network device as used here collectively includes ONTs, ONUs, and OLTs, or like devices.

Generally, the OLT 102 provides downstream broadcasts to each of the ONTs 108 and each of the ONUs 104 on different dedicated one-to-one fibers, where each ONT 108 and/or ONU 104 individually reads only the content of the transmissions intended for the particular ONT 108 and/or ONU 104. The ONTs 108 and the ONUs 104 provide upstream transmissions to the OLT 102 via their individual fibers. Communications between the OLT 102 and the ONT 108 or ONU 104 generally utilize wavelength division multiplexing with the downstream broadcasts utilizing one wavelength and upstream transmissions utilizing another wavelength. In some examples, the optical fibers 106 and 110 may be compliant with the ITU G.652 standard and support downstream wavelengths between 1480-1500 nm and upstream wavelengths between 1260-1360 nm. For two-fiber downstream systems, the downstream wavelengths may be 1260-1360 nm. Of course, the passive optical networks herein are not limited to a particular wavelength range on downstream or upstream communication. Furthermore, although the passive optical network configuration 100 is described as having one-to-one fibers between the OLT 102 and the ONTs/ONUs 108, 104, it should be understood that multiple fibers may be utilized in the one-to-one correspondence between the OLT 102 and each corresponding ONT/ONU 108, 104. In one example, each connection between the OLT 102 and the ONTs/ONUs 108, 104 may utilize two fibers, with one for upstream transmissions and one for downstream transmission, rather than wavelength division multiplexing signals that share the same fiber.

The OLT 102 provides a variety of functions within the passive optical network 100. At one level, the OLT 102 provides the interface 114 between the passive optical network 100 and a backbone network of the service provider network, which may include supporting time division multiplexed (TDM) protocols at different rates of speed, internet protocol (IP) traffic, asynchronous transfer mode (ATM) protocols, etc. The OLT 102 further facilitates both upstream and downstream communication between the service provider and the ONTs 108 and the ONUs 104, and between ONTs 108 and the ONUs 104. For example, the OLT 102 allocates upstream bandwidth to the ONTs 108 and the ONUs 104 by granting intervals of time (e.g., time slot assignments) to each of the ONTs 108 and the ONUs 104 to transmit upstream communications without collisions on the fiber. Upstream bandwidth allocation may be fixed for ONTs 108 and the ONUs 104 requiring continuous (e.g., guaranteed) bandwidth availability. For ONTs 108 and the ONUs 104 that do not require continuous bandwidth availability (e.g., burst transmissions), the OLT 102 may utilize dynamic bandwidth allocation (DBA) based on either polling bandwidth information from the ONTs 108 and the ONUs 104 or based on the occurrence of idle gigabit passive optical network (GPON) encapsulation method (GEM) frames from the ONTs 108 and the ONUs 104. In addition, the ONTs 108 and the ONUs 104 are typically provided at different distances from the OLT 102, and the OLT 102 utilizes a ranging protocol to equalize the optical path length and equalize the transmission delay between the OLT 102 and the various ONTs 108 and the ONUs 104. For example, the OLT 102 may measure the transmission delay for each ONT 108 and ONU 104, and transmits a physical layer operations and maintenance (PLOAM) message to set the transmission delay in the ONT 108 or ONU 104. The OLT 102 further provides centralized media access control (MAC) for the passive optical network 100 for purposes of upstream bandwidth allocation.

Upstream and downstream transmissions between the OLT 102 and the ONTs 108 or ONUs 104 may be performed in a transmission convergence frame format, whereby the transmission data, regardless of the services being provided, is encapsulated in the same type of data packet for transmission over the passive optical network 100. In particular, the transmissions between the OLT 102 and the ONTs 108 or ONUs 104 may take advantage of the gigabit passive optical network (GPON) standard developed by the International Telecommunications Union (ITU). The GPON standard is also known as ITU-T G.984. As is known, the GPON standard generally provides greater security as compared to previous standards, greater bandwidth, larger variable-width data packets, higher data rates and supports various Layer 2 protocols including ATM, Ethernet and GPON encapsulation method (GEM).

Although the disclosure generally refers to a gigabit passive optical network (GPON), it should be understood that all or part of this disclosure may be equally applicable to, or supportive of, previous-generation passive optical network standards, such as asynchronous transfer mode (ATM) passive optical network (APON) and broadband passive optical network (BPON), current passive optical network standards, such as Ethernet passive optical network (EPON), and future passive optical network standards, such as wavelength division multiplex passive optical network (WDM-PON). The disclosure may also be equally applicable to variations on the GPON standard.

Figure 2:
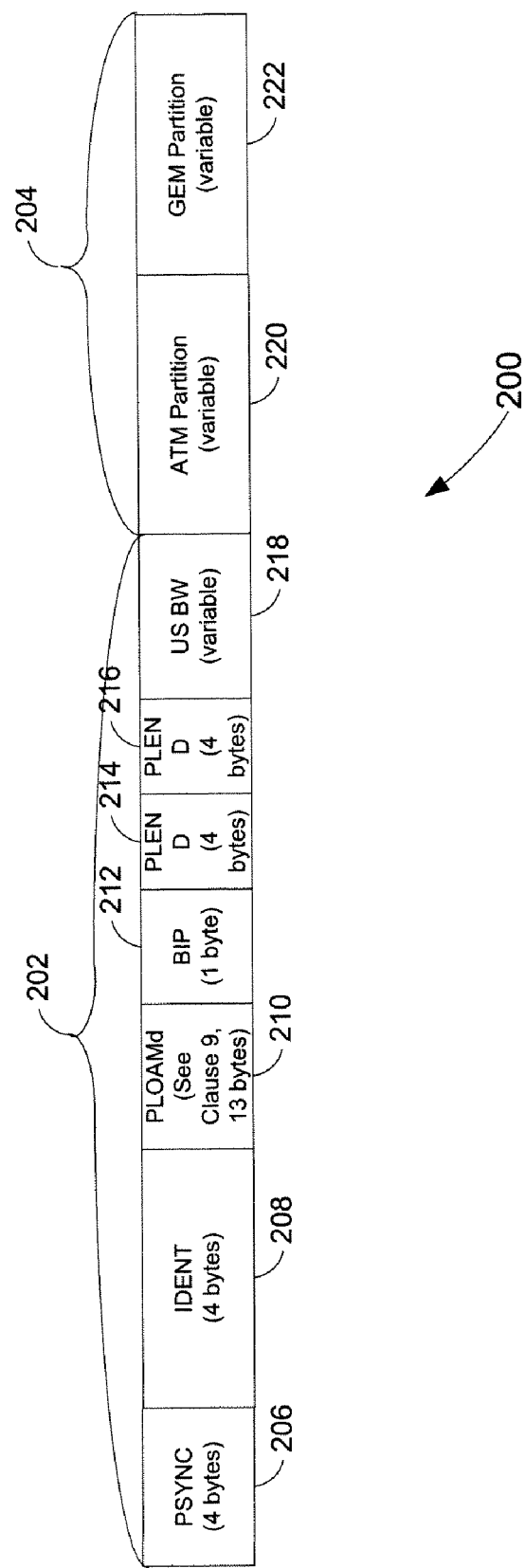
FIG. 2 is a schematic diagram of a downstream gigabit passive optical network transmission convergence frame format.

FIG. 2 is an example of a downstream transmission convergence layer (TC-Layer) frame format 200 using the GPON standard and which may be utilized for downstream transmissions from the OLT 102 to the ONTs 108 and ONUs 104. The downstream frame format 200 generally includes an overhead field 202 and a payload field 204, where the overhead field 202 includes several sub-fields to be assembled by the OLT 102 and the payload field 204 includes the information being sent to the ONT 108 or ONU 104 (e.g., service data). As indicated above, the data for the payload field 204 may be provided in one or more transport formats, such as ATM or GEM, and as a variable length data packet. As also indicated above, while the following disclosure involves an example of the downstream transmission convergence layer (TC-Layer) frame format 200, as well as the subsequent upstream transmission convergence layer (TC-Layer) frame format discussed further below, it should be understood that variations of the downstream and upstream formats may occur and the disclosure is not limited to the particulars examples given herein.

The overhead field 202 for the downstream transmission frame may be referred to as the physical control block downstream (PCBd), and may include a physical synchronization (PSYNC) field 206, an identification (Ident) field 208, a physical layer operations and maintenance downstream (PLOAMd) field 210, a bit interleaved parity (BIP) field 212, two payload length downstream (PLEND) fields 214, 216 and an upstream bandwidth map (US BWmap) field 218. The PSYNC field 206 is a fixed pattern that generally begins the overhead field 202, such that an ONT or ONU may use the PSYNC field 206 to identify the beginning of the frame 200 and establish synchronization with the downstream transmission. When the ONT 108 or ONU 104 finds the PSYNC field 206 within a frame of a downstream transmission from the OLT 102, the ONT/ONU 108, 104 may utilize a synchronization state machine, or other synchronization method, and search for other PSYNC fields 206 within subsequent frames to establish and monitor the synchronization state with the transmission. In one example, a counter may be set upon identifying a unique value in the PSYNC field 206, with the counter being incremented for each valid PSYNC field 206 read by the ONT/ONU 108, 104. Once the counter reaches a predetermined threshold, the ONT/ONU 108, 104 is able to enter into a synchronization state whereby the ONT/ONU 108, 104 is in synchronization with the downstream transmission rate. The ONT/ONU 108, 104 may thereby determine it has discovered the downstream frame structure and begin to process the overhead information. The ONT/ONU 108, 104 may also maintain a count for invalid or incorrect PSYNC fields 206, and if the incorrect count reaches a predetermined threshold, the ONT/ONU 108, 104 may determine that it has lost the downstream frame structure and repeat the search for a valid or correct PSYNC field 206. However, it should be understood that different state machines or different manners of establishing and monitoring synchronization with the transmission may be utilized.

The Ident field 208 may be used to indicate large frame structures (superframes) within the downstream transmission frame, and which may be used to control data encryption and to provide lower rate synchronization reference signals. Generally, the Ident field 208 may include an FEC field, a reserved field, and a superframe counter. The FEC field indicates whether forward error correction (FEC) is being enabled on the present downstream frame and may be used for FEC control. As is known, forward error correction is a method of error control for transmissions, where the OLT 102 may add redundant data to the downstream transmission frame, and the ONT/ONU 108, 104 may detect and correct errors using the redundant data, thereby avoiding retransmission of the downstream transmission frame from the OLT 102. The reserved field is reserved for other purposes, and the superframe counter provides error checking for potential dropped frames. The ONT/ONU 108, 104 loads the superframe counter value and compares its local expected value with the superframe counter value, whereby a match indicates correct synchronization and a mismatch indicates a transmission error or desynchronization.

The PLOAMd field 210 may contain a downstream PLOAM message from the OLT 102 and that may be used as a control message for alerts, activation-related messages, instructions, etc.

The PLOAMd field 210 may be formatted to also include an ONU ID, a Message-ID, the message Data and a cyclic redundancy check (CRC). The ONU ID identifies the ONT/ONU 108, 104 to receive the PLOAM message. The Message-ID identifies the type of PLOAM message. The message Data is used for the payload of the PLOAM message. The CRC is a frame check sequence, such that the PLOAM message may be discarded upon receipt if the CRC is incorrect.

The BIP field 212 contains the bit interleaved parity of the bytes that have been transmitted since the previous BIP. The ONT/ONU 108, 104 independently determines the BIP and compares the result to the BIP field 212 to measure the number of errors in the transmission.

The redundant Plend fields 214, 216 specify the length of the bandwidth map (BWmap) (also referred to as the bandwidth allocation) and any ATM partition in the payload 202. The length of the bandwidth map provides the limit of the number of allocation IDs that may be granted in any particular duration in any 125 microsecond duration up to 4095.

The US BW map field 218 provides an upstream bandwidth allocation as processed by the OLT 102 acting as the main or central controller for the ONTs 108 and ONUs 104. The BWmap field may be provided as an array of allocation structures, where each entry in the array represents a single bandwidth allocation to a particular transmission container (T-CONT). The number of entries in the BW map is provided in the Plend field 214, 216. The access fields are distributed to the ONTs/ONUs which become slaves to the OLT 102 and are required to follow the provided format.

The US BW field 218, for example, may include fields showing start and stop times for the upstream transmission window for an ONU/ONT 108, 104, as well as a CRC field for error correction and various flag fields. The US BW field 218 may also include an allocation ID field that indicates the particular transmission container (T-CONT) that is being granted time on the upstream transmission.

The flags in the US BW field 218 may contain separate indications on how the (bandwidth) allocation should be used by the ONT/ONU 108, 104, including information to be sent back to the OLT 102 during the bandwidth allocation provided to the ONT/ONU 108, 104. The flags field may include a power leveling sequencing (PLSu) field used for power control measurements by the ONU/ONT 108, 104; a PLOAMu field that directs the ONT/ONU 108, 104 to send its PLOAMu information during the associated bandwidth allocation; an FEC field that causes the ONT/ONU 108, 104 to compute and insert an FEC parity during the associated bandwidth allocation, and a DBRu field that causes the ONT/ONU 108, 104 to send an upstream Dynamic Bandwidth Report indicating the number of cells or blocks in the T-CONT buffer of the ONT/ONU 108, 104, from which the OLT 102 may determine the congestion status of each T-CONT.

Each ONT/ONU 108, 104 uses the start and stop fields of the US BW field 218 to determine when to start and stop its upstream transmission. Each ONT/ONU 108, 104 identifies which particular information among the allocation structures is for its own use as filtered through the allocation of the stop bits within the access portion of the frame.

The transmission convergence payload field 204 may include both an ATM payload field 220 universal or partition, and a GEM payload field 222 universal or partition. As such, a variety of user data types may be carried in the GPON transmission convergence payload. The ATM partition 220 may contain a number of ATM cells, the length of which is provided in the Plend fields 214, 216. The OLT 102 may allocate as many cell durations as needed in the downstream, including almost the entire downstream frame.

The GEM partition 222 contains a variable number of GEM frame-mode delineated frames (GEM1, GEM2, etc.). The length of the GEM partition 222 is determined based on whatever remains after the overhead 202 and ATM partitions 220 are subtracted from the overall frame length. The GEM protocol provides delineation of the user data frame (either going to or coming from a user) and provides port identification for multiplexing. Delineation and port identification are accomplished by the GEM header discussed below. The delineation process uses the GEM header at the beginning of every downstream GEM partition and every upstream GEM payload. As such, in a downstream transmission the ONT/ONU 108, 104 is assured of finding the first header and may find subsequent headers using the payload length identified (PLI) as a pointer.

Each GEM frame 222 may include a header containing a payload length indicator (PLI) field, a Port-ID field, a payload type indicator (PTI) field, and fragment payload. The size of the PLI field (e.g., 12-bits) determines the size of the GEM fragments (e.g., up to 4095 bytes). The PTI field indicates the content type of the fragment payload and how the fragment payload should be treated (e.g., user data fragment; congestion has or has not occurred; end or not end of a frame). The downstream frame transmission is filtered at the ONT/ONU 108, 104 based upon the Port-ID field contained in each GEM fragment. Frames belonging to the ONT/ONU 108, 104, each of which is configured to recognize which Port-IDs belong to it, are passed on to the GEM client process.

Figure 3:
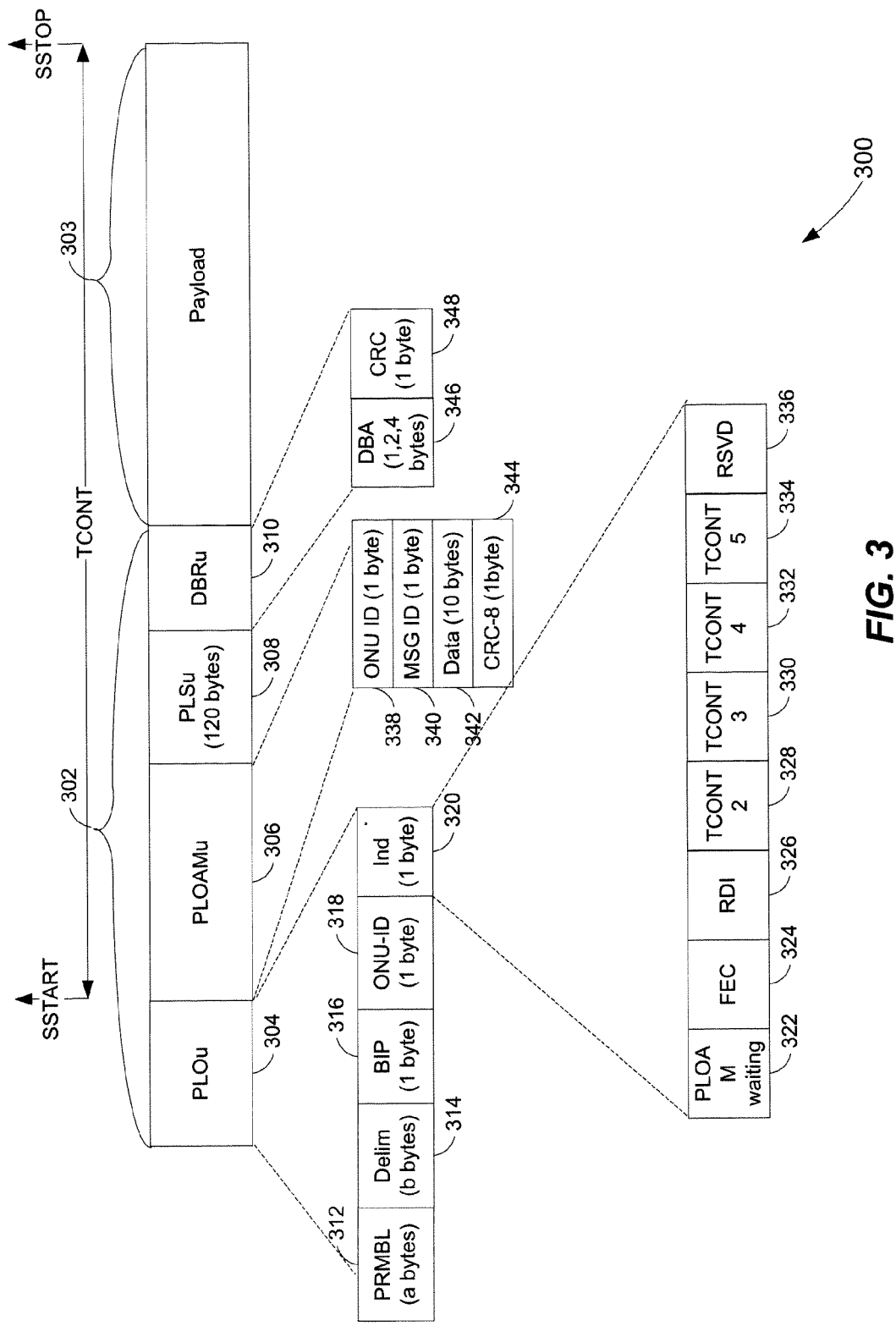
FIG. 3 is a schematic diagram of an upstream gigabit passive optical network transmission convergence frame format.

FIG. 3 is an example of an upstream transmission convergence layer (TC-Layer) frame format 300 using the GPON standard and which may be utilized for upstream transmissions from the ONTs 108 and/or ONUs 104 to the OLT 102. The upstream frame format 300 generally includes an overhead field 302 and a payload field 303. The overhead field 302 includes several sub-fields to be assembled by the ONT/ONU and processed by the OLT 102 and the payload field 303 includes the information being sent to the OLT 102 or to the service provider network. As indicated above, the data for the payload field 303 may be provided in one or more transport formats, such as ATM or GEM, and as a variable length data packet. The frame length of the upstream transmission convergence layer (TC-Layer) frame format 300 may be the same as that of the downstream transmission convergence layer (TC-Layer) frame format 200 for all transmission rates. Each frame may contain a number of transmissions from one or more ONTs/ONUs 108, 104, where the BWmap defines the arrangement of the transmissions. As seen in FIG. 3, the T-CONT of the upstream message is defined by the start and stop transmission times (start and stop) as determined by the OLT 102 during the downstream transmission, but does not include the PLOu field which is sent immediately prior to the start time pointer start.

The overhead field 302 for the upstream transmission frame may include various types of overheads, including physical layer overhead (PLOu) 304, physical layer operations and management upstream (PLOAMu) 306, power leveling sequence upstream (PLSu) 308 and dynamic bandwidth report upstream (DBRu) 310. As discussed above, a flag field in the downstream transmission assembled by the OLT 102 may indicate whether PLOAMu, PLSu or DBRu information should be sent from the ONT/ONU 108, 104 on each bandwidth allocation. The upstream frame is generally scrambled, and may be scrambled using a frame-synchronous scrambling polynomial.

The PLOu field 304 includes the physical layer overhead, which is provided as a preamble (PRMBL) field 312 and a delimiter (Delim) field 314. Three additional fields of data corresponding to the ONT/ONU 108, 104 as a whole are also provided: a bit interleaved parity (BIP) field 316, an ONT/ONU 108, 104 identification (ONU-ID) field 318 and an indication (Ind) field 320. The above data is generally provided at the beginning on any transmission burst from an ONT/ONU. The status of the PLOu information is given by the arrangement of the bandwidth allocations. Every time an ONT/ONU 108, 104 takes over the passive optical network 100 from another ONT/ONU 108, 104, the ONT/ONU 108, 104 sends a new copy of the PLOu data. The GPON transmission convergence layer sources the PLOu 304. The preamble field 312 is used to synchronize the OLT 102 to the incoming message, and the delimiter field 314 is used by the OLT 102 to identify where the first bit of important information in the frame begins. The preamble field 312 and the delimiter field 314 are formed as determined by the OLT 102 in the PLOAM message discussed above. As seen in FIG. 3, the preamble and delimiter fields 312, 314 are transmitted before the allocation start time start pointer, as previously dictated by the OLT 102.

The BIP field 316 contains the bit interleaved parity of the bytes transmitted since the last BIP from the transmitting ONT/ONU, excluding those of the preamble and delimiter fields 312, 314. The OLT 102 computes the bit-interleaved parity for each ONT/ONU 108, 104 burst, and compares the result to the BIP of the BIP field 316 to measure the number of errors in the link. The ONU-ID field 318 contains the unique identification of the transmitting ONT/ONU 108, 104. The ONU-ID is generally assigned to the ONT/ONU 108, 104 during the ranging process.

The Ind field 320 provides a real-time ONT/ONU status report to the OLT. As shown in FIG. 3, the Ind field 320 is provided as a PLOAM waiting field 322 indicating if one or more PLOAM messages are waiting, an FEC field 324 indicating if forward error correction is enabled or not, a remote defect indication (RDI) field 326 indicating if a defect occurred or not, traffic waiting indicator fields for type 2 T-CONTs 328, type 3 T-CONTs 330, type 4 T-CONTs 332 and type 5 T-CONTs 334, as well as reserved bits 336. If the PLOAM waiting field 322 indicates an urgent PLOAM message is waiting, the OLT 102 may issue an upstream allocation that allows the ONT/ONU 108, 104 to send the PLOAM message in a timely manner. Further uses of the Ind field 320, and in particular the T-CONT fields 328, 330, 332, 334, are discussed below in relation to the DBRu field 310.

Examples of the PLOAM messages as provided in the PLOAMu field 306 are discussed above, and may be provided by the transmitting ONT/ONU 108, 104 in response to a corresponding request from the OLT 102. In particular, the PLOAMu field 306 may only be sent when indicated by the flags in the US BW field 218. The PLOAMu field 306 may have a similar structure as the PLOAMd field 210, including an ONU ID 338 of the transmitting ONT/ONU 108, 104, a Message-ID 340 identifying the type of PLOAM message, the message Data 342 for the payload of the message, and a cyclic redundancy check (CRC) 344 to detect and correct errors in the header fields 338, 340, 342.

The PLSu field 308 is used for power control measurements by the ONT/ONU and adjusts the ONT/ONU 108, 104 power levels to reduce the optical dynamic range seen by the OLT 102. The content of the PLSu field 308 is generally set by the ONT/ONU 108, 104, and is sent by the ONT/ONU 108, 104 when indicated in the Flags field of a downstream transmission from the OLT 102. For example, the OLT 102 may set the PLSu bit on broadcast allocation to allow the ONT/ONU 108, 104 to use set up its transmitter during the activation process. If the ONT/ONU 108, 104 does not use the PLSu field 308, the ONT/ONU 108, 104 may deactivate its transmitter for that time. During operation of the ONT/ONU 108, 104, the ONT/ONU 108, 104 generally transmits following the PLSu field 308, such that the ONT/ONU 108, 104 sends the PLSu when it is requested by the OLT 102 regardless of any need to perform transmitter adjustment.

The DBRu field 310 includes information that is associated with the T-CONT entity, rather than the ONT/ONU 108, 104. The DBRu field 310 is sent when requested by the OLT 102 in the flags field of a downstream transmission. The DBRu field 310 includes a dynamic bandwidth allocation (DBA) field 346 and a CRC field 348. The DBA field 346 contains the traffic status of the particular T-CONT, and may be used by the OLT 102 for bandwidth allocation for the ONT/ONU 108, 104. DBA may be supported via status reporting and OLT traffic monitoring for those ONTs/ONUs 108, 104 that do not report status. Status reporting DBA may be provided as status indications in the PLOu, in the DBRu as shown in FIG. 3, or in an ONU report in a DBA payload.

Status indications may be carried as four bits in the PLOu Ind field 320, and provide a report for each type of T-CONT 328, 330, 332, 334. Each bit may correspond to a different T-CONT type. If a bit is set for a particular T-CONT type 328, 330, 332, 334, the OLT 102 may assume there is some data waiting in one of the T-CONT buffers of that type. It is noted that T-CONT types 2, 3 and 4 328, 330, 332 may not have a fixed bandwidth component and any data waiting in those T-CONTs 328, 330, 332 causes the corresponding indicator to be set, whereas a T-CONT type 5 field buffer 334 may contain data belonging to a fixed bandwidth such that the presence of non-fixed bandwidth sets the corresponding indicator. The status indications provide an early warning to the OLT 102 that data is waiting, though it is not required that the OLT DBA algorithm wait for such indications before allocating bandwidth to the ONT/ONU 108, 104 in order to avoid unnecessary delays. The OLT 102 may use the status indications for a fast alert that DBA supervision may be needed at the ONT/ONU 108, 104 without identifying the T-CONT 328, 330, 332, 334 or bandwidth detail.

Status reporting DBA in the DBRu field 310, shown in FIG. 3 as the DBA field 346, provides a continuous update of the traffic status of a particular T-CONT 328, 330, 332, 334 and is carried in the DBRu field 310 associated with the T-CONT 328, 330, 332, 334. The status report in the DBA field 346 specifies the amount of data waiting in the T-CONT buffer corresponding to the allocation identification (Alloc-ID) that triggered the DBRu transmission. The OLT 102 may trigger the transmission of the DBRu by setting a DBRu field in the US BW field 218 of a downstream transmission 200. The CRC field 348 protects the report in the DBA field 346 and DBRu structure with error correction and detection. The OLT may implement the error detecting and correcting functions associated with the CRC field 348 (e.g., CRC-8). If the CRC function indicates an uncorrectable error, the information in the DBRu field 310 may be discarded.

An ONU report in a DBA payload allows for the ONT/ONU to send a DBA report on any T-CONT in the transmission, and is carried in a dedicated DBA payload partition allocated by the OLT in the upstream. The ONT/ONU may select the T-CONT that is the subject of the report, and allows the OLT 102 to schedule a DBA payload which is generally smaller that that required to report on all the T-CONTs in the ONT/ONU.

The upstream payload field 303 may be used to carry ATM cells, GEM-delineated frames or DBA reports. The ATM upstream payload includes a number of ATM cells from the ONT/ONU to the OLT 102, and the length of the payload is given by the duration of the allocation minus the size of any requested overhead. The ONT/ONU 108, 104 may buffer the ATM cells as are they are provided by the OLT 102 and send them in a burst during the allocated time. The OLT 102 receives the ATM cells, and may multiplex them with other bursts from other ONTs/ONUs 108, 104 and pass them to the OLT ATM client. The GEM payload contains any number of GEM frame-mode delineated frames, and the length of the payload is also given by the duration of the allocation minus the size of any requested overhead. The GEM protocol provides delineation of the user data frame (either going to or coming from a user) and provides port identification for multiplexing. As discussed above, delineation and port identification are accomplished by a GEM header, where the delineation process uses the GEM header at the beginning of every upstream GEM payload. As such, in an upstream transmission the OLT 102 is assured of finding the first header and may find subsequent headers using the PLI as a pointer. The DBA payload is discussed above, and contains a group of dynamic bandwidth allocation reports from the ONT/ONU 108, 104.

Figure 4:
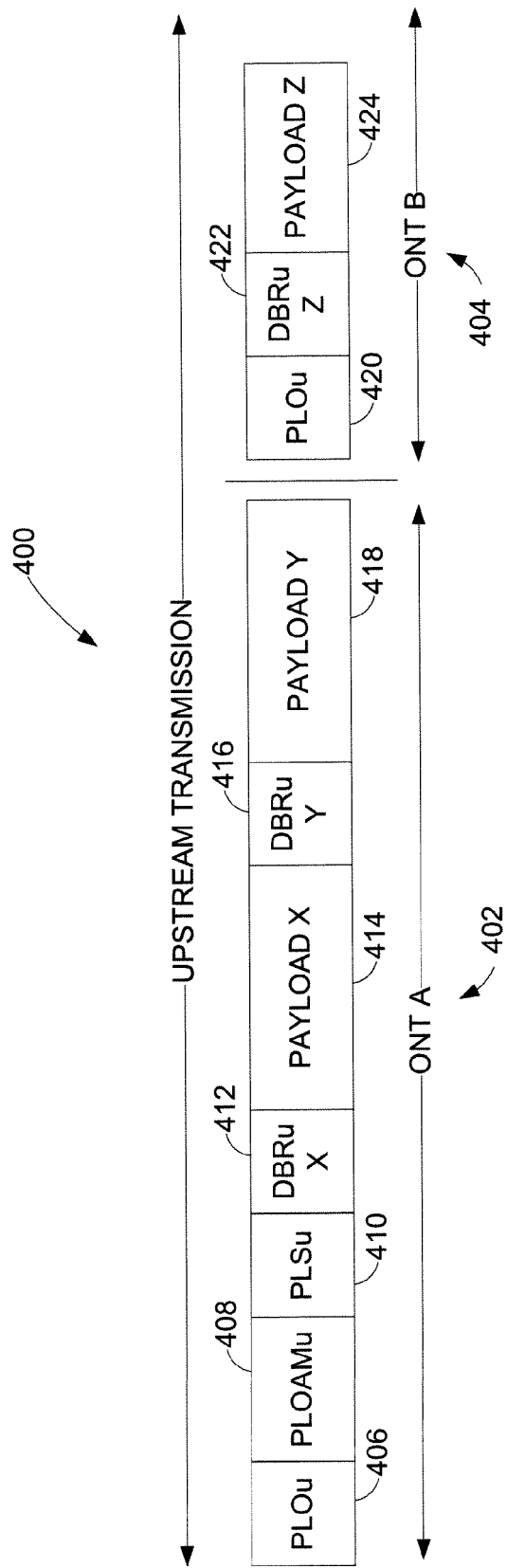
FIG. 4 is a block diagram of an example upstream transmission including multiple burst transmissions.

FIG. 4 illustrates an upstream transmission 400 that includes upstream burst transmissions 402 and 404 for two different ONU/ONT devices on a passive optical network. Each burst transmission 402 and 404 transmits in the corresponding ONU/ONT bandwidth window identified by the OLT. The burst transmission 402 includes overhead fields such as a PLOu field 406, a PLOAMu field 408, a PLSu field 410 and two sets of payloads. The burst transmission 402 further includes overhead field DBRu X field 412, as well as payload X 414. The burst transmission 402 further includes a second DBRu Y field 416 and a second payload Y 418. The burst transmission 402 is from an ONT A (ONU A) on a GPON. A second ONT B (or ONU B) transmits the burst transmission 404 which contains a PLOu field 420 and a DBRu Z field 422 and a payload field 424.

In a GPON, each of the burst transmissions 402 and 404 can be transmitted at a different data rate (or nominal bit rate) selected from among the different data rates supported by a GPON upstream transmission frame format: 155.52 Mb/s, 622.08 Mb/s, 1244.16 Mb/s, and 2488.32 Mb/s. Each ONU/ONT may use one of these data rates for its upstream burst signal. As such, the OLT must be able to properly recover the particular data rate of the transmitting ONU/ONT, i.e., the proper data rate of the upstream burst transmission, otherwise upstream transmission errors may result.

Figure 5:
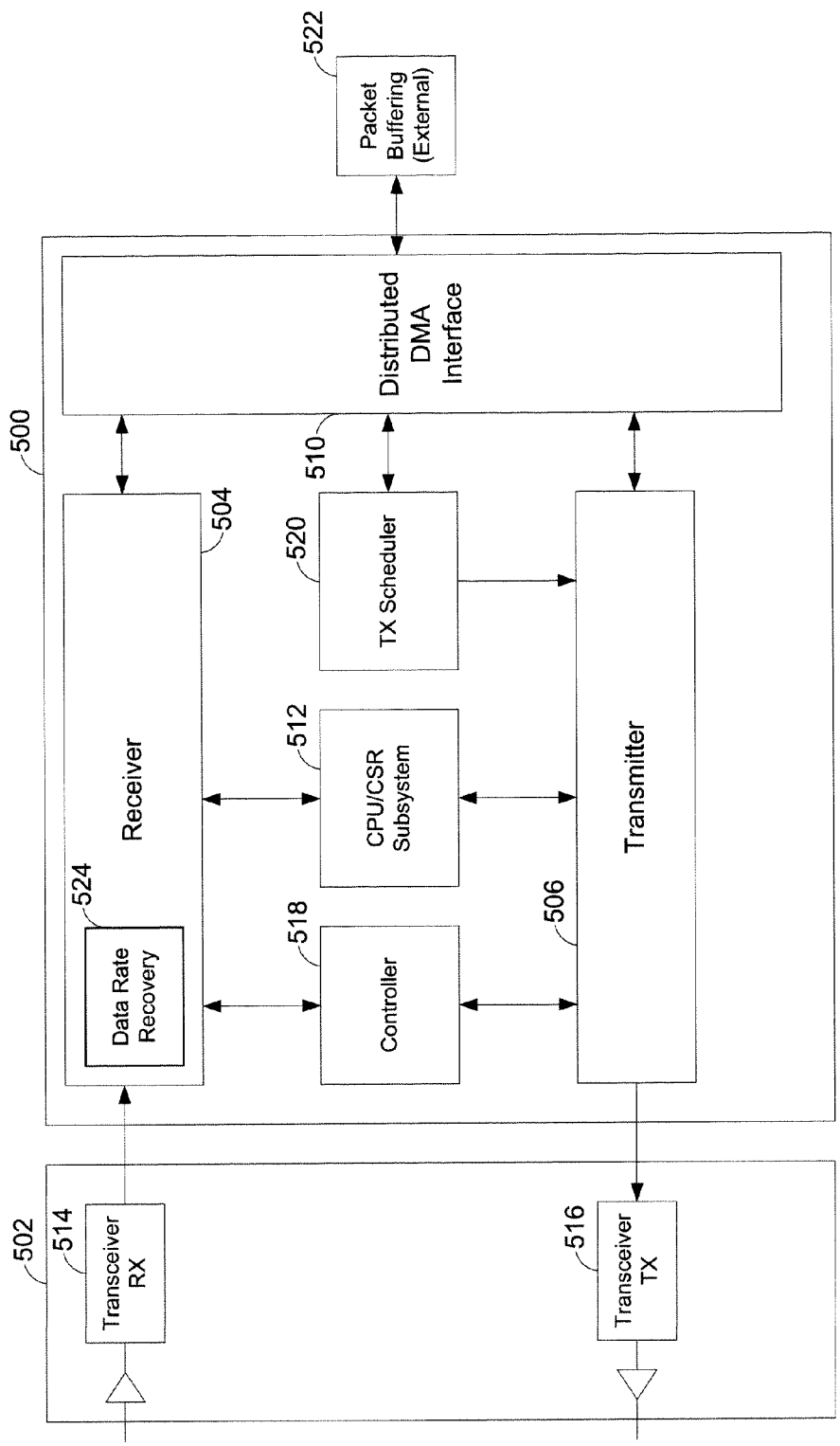
FIG. 5 is a block diagram of an example gigabit passive optical network chip of an integrated circuit that may be used within the optical line termination shown in FIG. 1.

FIG. 5 is a block diagram of an example of a chip 500 that may be used in an OLT 102/The chip 502 will be described in the context of the GTC frame formats discussed above. The universal GPON chip 500 is coupled to the passive optical network 100 via an optoelectronic transceiver interface 502, and includes a receiver 504 for receiving transmissions over the passive optical network 100, a transmitter 506 for assembling and transmitting transmissions over the passive optical network 100, a distributed direct memory access (DMA) interface 510 to interconnect with a subsystem external to the chip 500, and an internal processor 512 for processing time-sensitive functions associated with the transmission, such as processing the overhead of a transmission and assembling the frame of a transmission.

The optoelectronic interface 502 generally includes an optoelectronic transceiver receiver 514 coupled to the receiver 504, and an optoelectronic transceiver transceiver 516 coupled to the transmitter 506, though it should be understood that different optoelectronic interfaces may be used. The receiver 504 and transmitter 506 generally conform to the transmission format used by the OLT 102, such as the upstream and downstream GTC frame formats provided above. As the OLT 102, upstream GTC frame formatted data is transmitted from the ONT 108/ONU 104 over the fiber 110, 106 into the transceiver 514 and is provided to the receiver 504, and downstream GTC frame formatted data is transmitted from the transmitter 516 to the transceiver 516 for transmission over the fiber 110, 106 to the ONT/ONU 108, 104.

The GPON chip 500 may include a controller 518 that may be a downstream bandwidth (DSBW) controller for an OLT 102 and which interacts with the transmitter 506 and the internal processor 512 to control the transmissions of the transmitter 506. Generally, the controller 518 and the internal processor 512 enable various functions of the receiver 504 and the transmitter 506. For example, the internal processor 512 may be used to determine errors in the communication link between the OLT 102 and the ONT/ONU 108, 104, process or provide instructions related to PLOAM messages, perform functions related to PLOAM messages, allocate bandwidth, dynamic ranging and power transmission levels adjustment.

As further seen in FIG. 5, the transmitter 506 is coupled to a scheduler 520, the controller 518 and the internal processor 512. The scheduler 520 may be a downstream transmission schedule for an OLT 102 or an upstream transmission scheduler for an ONT/ONU 108, 104. Generally, the schedule 520 may be used for traffic shaping, bandwidth allocation and head-of-line (HOL) arbitration.

The distributed DMA interface 510 provides distributed management of the packet buffer (e.g., external memory 522). In particular, the distributed DMA interface 510 provides an interface to a sub-assembly having the external memory 522 coupled to the GPON chip 500. The distributed DMA interface 510 may include an egress DMA engine and an ingress DMA engine coupled to a system-on-a-chip (SoC) interface (not shown), where the egress DMA engine is able to write data directly to the external memory 522 via the SoC interface, and where the ingress DMA engine is able to read data directly from the external memory 522 via the SoC interface. In some examples, the SoC processor may be responsible for non-time sensitive functions, the data of which is moved in and out of the external memory for processing by a separate external processor, and which may be provided from or provided to the OLT 102.

At a front end, the receiver 504 has a data rate recovery circuit 524 that is used to determine the date rate for the upstream transmission received by the transceiver 514, including the individual and potentially different data rates of each upstream burst in the upstream transmission.

Upstream and downstream the frame synchronization schemes and the core interface present two issues for GPON implementations. The first issue is with respect to downstream data bit and clock recovery circuit latency and variation. The clock data recovery (CDR) latency may be ignored with certain compensations from an equalization delay parameter, but the clock jitter or phase detection logic inside the ONU/ONT 108, 104 could still contribute +/-few bits of variation. In particular, the byte alignment logic must be locked with the same relationship with Psync and byte distance, even after a loss of frame (LOF) or loss of signal (LOS), or otherwise, the OLT 102 will set SUFi alarm and de-activate the ONU 104 resulting in ranging and activation failure.

Second, at the upstream burst logic, the time to enable the upstream transmission has to have resolution down to a per-bit level, which means the current 16-bit interface may not be adequate to meet the upstream variation requirement of the GPON specification, which are as follows:

i. 1.244 Gbit/s −8 bits
 ii. 622 Mbit/s −4 bits
 iii. 155 Mbit/s −1 bit

Since the OLT has the main clock used by all ONUs/ONTs 108, 104, there is no need to recover the actual clock from the upstream transmission. Instead, the data is to be recovered and moved into the core logic of the OLT 102 with a consistent and synchronized clock domain.

Figure 6:
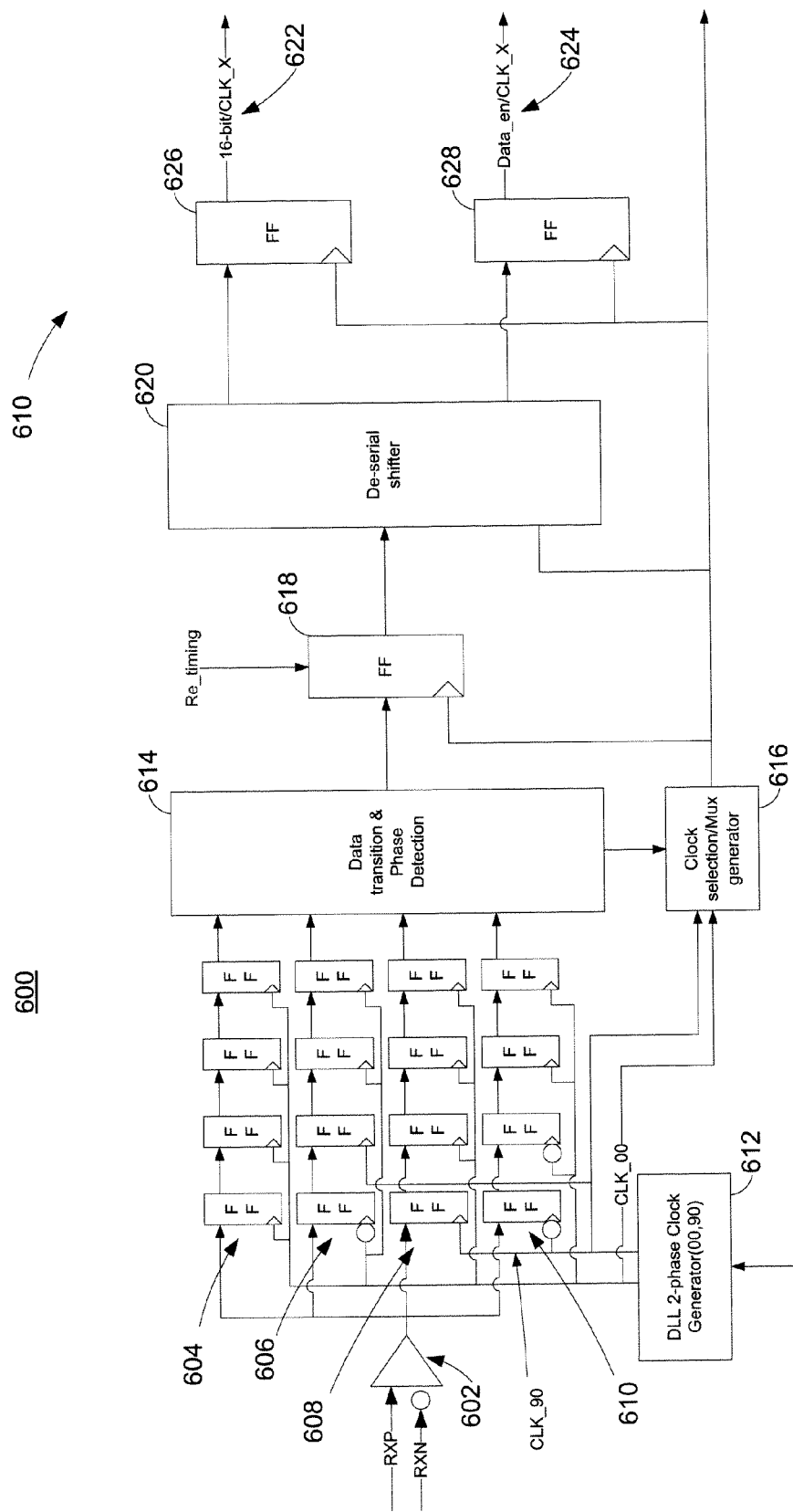
FIG. 6 is a block diagram of a data rate recovery circuit that may be used in a receiver of the optical line termination of FIG. 5.

FIG. 6 illustrates an example data rate recovery circuit 600 which may be used to recover the data rate of one or more upstream burst transmissions (such bursts 402 and 404) of an upstream transmission. Although the circuit 600 will be discussed in the context of the OLT 102, the circuit 600 is not limited to GPON applications, or OLTs 102, but may instead be used to recover upstream or downstream data rates for any multiplexed optical network application, including by way of example other time division multiplex application.

A differential pair of input signals are used to couple an upstream transmission to the circuit via receiver 602, which may be like the receiver 514. The upstream transmission, which contains overhead data and payload data as discussed above, is coupled to each of a bank of registers 604-610. The register banks 604-610 are configured in parallel and formed of multiple flip flop registers, as shown. A two-phase clock generator 612 produces two clock signals, each at the same clock rate, but phase shifted 90 degrees from one another. The clock generator 612 may produce the clock signals based on a downstream clock signal of the OLT 102, which is at 1.24 GHz in the illustrated example. In the typical environment, the clock rate generated by the generator 612 will be at one of the possible GPON upstream data rates, i.e., approximately 155 Mb/s, 622 Mb/s, 1244 Mb/s, and 2488 Mb/s. For the latter two, the clock generator 612 may receive one of the downstream clocks of a GPON compliant OLT, i.e., 1.244 Gb/s or 2.488 Gb/s. The remaining clocks (155.52 Mb/s and 622.08 Mb/s) may be generated from these downstream clocks, for example, through clock division. Of course, the generator 612 may be programmed to generate clock signals at other clock rates, as desired.

Each of the bank of registers 604-610 is setup to oversample the upstream transmission at different phase offsets of the clock signals from the generator 612. For example, the register bank 604 may sample the upstream transmission stating at a phase offset of 0 degrees, the register bank 608 starting at a phase offset of 90 degrees, the register bank 606 starting at a phase offset of 180 degrees, and the register bank 610 starting at a phase offset of 270 degrees. While four register banks are shown in the illustrated example, additional banks (e.g., 8 or 16) may be used to provide even finer oversampling to identify the optimal sample point for the clock signal.

The output of each of the bank of registers 604-610 is coupled to a data transition and phase detection circuit 614 that determines (as discussed further below) an edge transition state for each of the phase offset oversample points, i.e., whether a rising edge or a trailing edge has occurred over a clock cycle. The circuit 614 is coupled to a clock selection and multiplexer generator circuit 616 that is adapted to analyze the edge transition state data from the circuit 614 to determine the optimal sampling point for the clock signal. The circuit 616 identifies which of the register banks (604-610) is sampling the upstream transmission at the optimal (i.e., or most optimal) sampling point and then instructs the data transition and phase detection circuit 614 to transmit the sampled upstream transmission from that particular register bank to downstream circuitry in the receiver for overhead and payload processing.

The upstream transmission from the circuit 614 is coupled to a latch 618 and then to a deserializer shifter 620, which deserializes the upstream transmission (specifically the overhead and payload) and, under control of the clock generator 616 produces a clocked data bus clock signal 622 and a clocked data enable clock signal 624 through latches 626 and 628, respectively.

Figure 7:
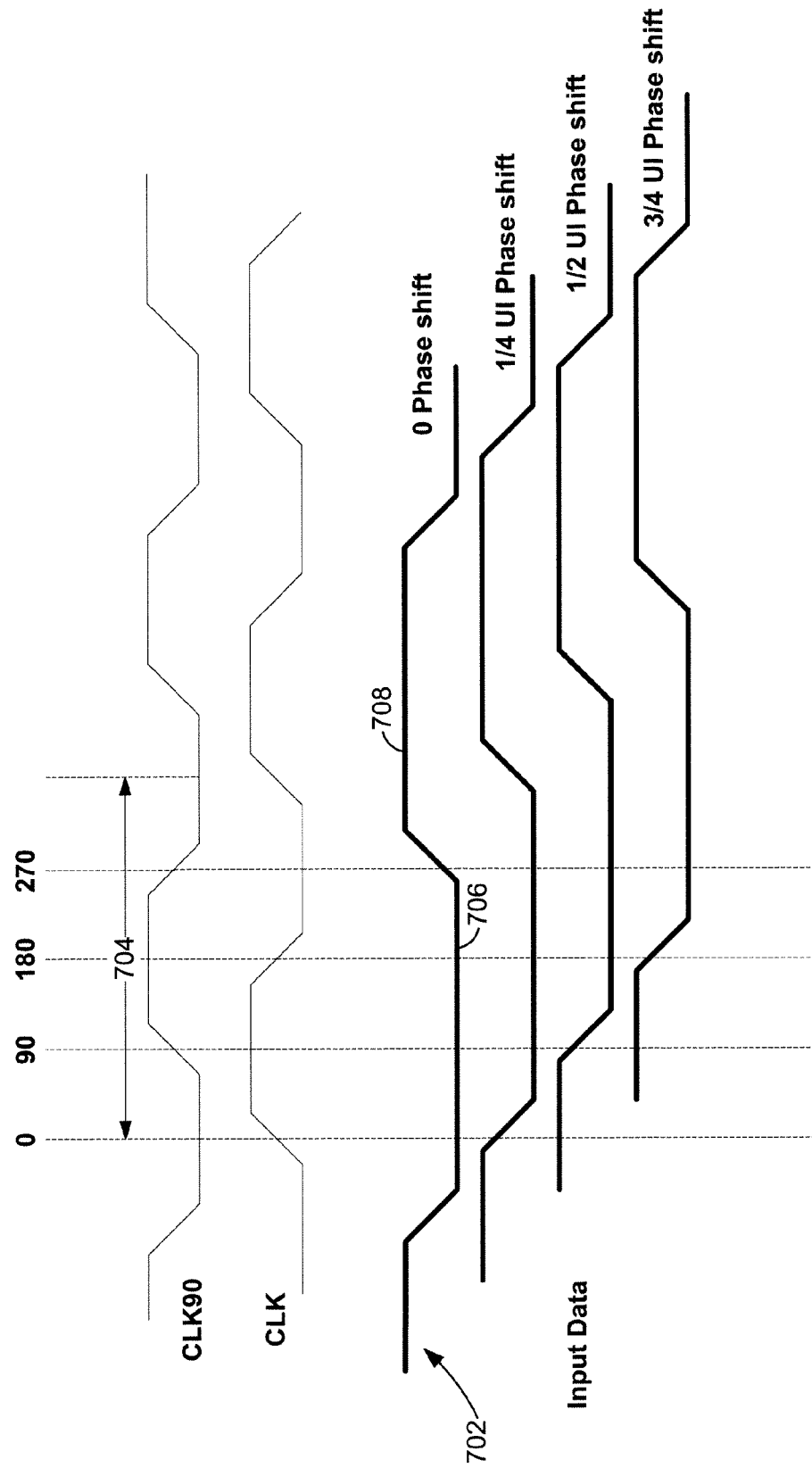
FIG. 7 is a diagram showing oversampling of an input signal at four different phase offsets and sampled four times in a clock cycle.

FIG. 7 illustrates an example of oversampling an input data using 4 phase offset clock signals, as may be applied by the register banks 604-610. Two 90 degree phase offset clock signals (CLK and CLK90), both of the same clock rate, are shown. The clock rate may be any clock (data) rate allowed for a GPON upstream transmission, for example. Because there are four register banks, the data rate recovery circuit 600 is able to sample the upstream transmission 702 four times within a single clock cycle 704.

To illustrate the determination of the optimal sample point, the upstream transmission 702 is shown in four different phase offset positions, each offset a quarter of a cycle. In the 0 phase shift position, sampling the upstream transmission 702 at 0 degrees, 90 degrees, 180 degrees, and 270 degrees results in the edge transition state at each sampling being low, indicating that the upstream transmission over these sample points is in a low logic state (e.g., logic 0). The optimal sampling point may be arbitrarily set to any of these points, but one useful point is the sampling point nearest to a central maximum of a logic low pulse 706 (or a logic high pulse 708) on the transmission 702. This center point occurs at or near the sample points for 90 degrees and 180 degrees. The clock select circuit 616 may be adapted to select either of these as the optimal sampling point, as a result. By convention in the illustrated examples, the circuit 616 has been programmed, designed, hardwired, etc. to identify 180 degrees as the optimal sampling point. Although they may be chosen instead, choosing either the 0 degree sampling point or the 270 degree sampling point may result in sampling the upstream transmission too close to a falling or rising transition edge and thus not properly identify the data. Similarly, for the ¼ phase shift on the upstream transmission, the sample points may indicate to the circuit 616 that the sample point at 270 degrees phase offset is the optimal sample point. For the ½ phase shift, the circuit 616 may determine that the optimal sample point is at the 0 degrees phase offset, and for the ¾ phase shift, the circuit may identify the 90 degrees phase offset as the optimal point for sampling of the upstream transmission. As explained further below, the particular optimal sample point may be determined by a truth table and with conventions as desired by the designer.

The clock selection and multiplexer generator circuit 616 may determine the optional sampling point using a truth table, such as shown below. The edge transition states (Rising edge, R, or Falling edge, F) for each of register bank is determined by the detection circuit 614 and the possible values are compared to the truth table to identify an optimal sampling point either a 180°, 270°, 0°, or 90° phase of the clock signal, corresponding to one of the register banks.

Other output possibilities, if they occur, would typically indicate that the wrong frequency is being used for the clock rate or that there was no edge transition (low-to-high or high-to-low) in the data at the oversampled rate.

That is, the circuit 616 analyzes the edge transition data from each register bank 604-610 and then compares the four results to the truth table above, to identify the optimal sampling position, i.e., phase offset. The circuit 616 then instructs to use the output from that register as the optimal sampled version of the upstream transmission at the data rate for the registers. In an example, the optimal sampling point is identified once for each burst in the upstream transmission. However, the optimal sampling point could be determined every clock cycle, or at some other interval.

As will be apparent, if additional register banks are used, then more oversampling will occur within the clock cycle 704 allowing the circuit 616 to more accurately determine the center point of the logic low pulse 706 or the center point of a logic high pulse 708 of the upstream transmission 702. A larger truth table (e.g., 8×8 or 16×16) would result.

Figure 8:
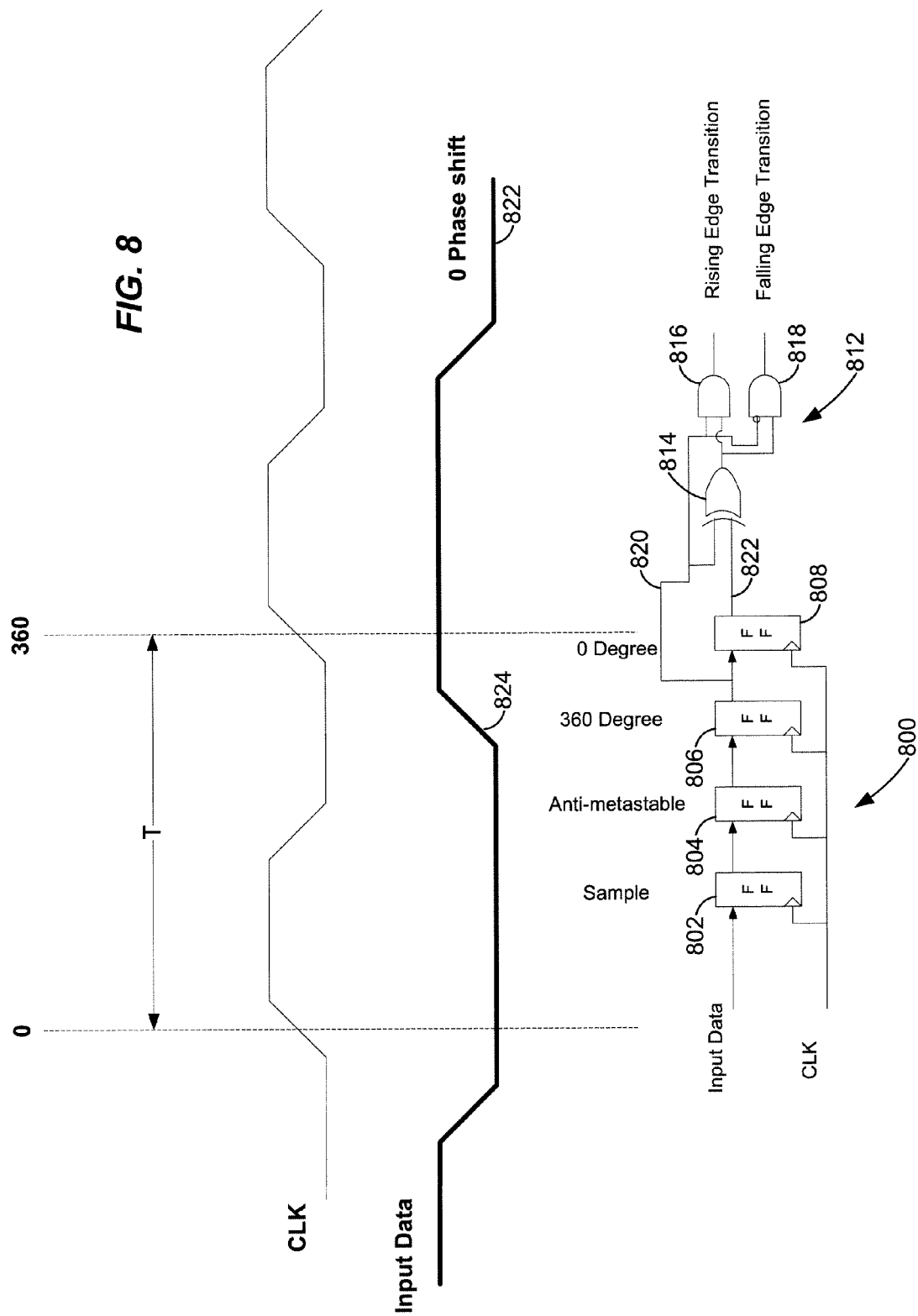
FIG. 8 is a block diagram showing example logic circuitry for detecting an edge transition state for an upstream transmission.

FIG. 8 illustrates an example register bank and data transition and phase detection circuit pairing in an example implementation of the register banks 604-610 and corresponding circuit 614. Input data (e.g., the upstream transmission) and clock signal CLK are coupled to a register bank 800, which includes a sampling flip flop register 802, an anti-metastable flip flop register 804, a 360 degree buffer flip flop register 806, and a 0 degree flip flop register 808 all coupled in series with each flip flop 804-808 coupled to the output of the preceding flip flop, and with the clock signal latching each. The output from the register bank 800 is coupled to a data transition and phase detection circuit 812 that includes an XOR gate 814 and two AND gates 816, 818, the latter having an inverted input. The value of the input data (logic high or logic low) at the 360° phase point of the clock signal is coupled on a first input line 820 to the circuit 812. In the illustrated example the 360 degree phase point corresponds to a logic high for input data. A line 822 provides the 0 degree phase point value of the input data to the circuit 812, which in the illustrated example is a logic low value. From these values, over the clock period T, the circuit 812 sees an initial phase point with a logic low and a subsequent phase point as a logic high and determines that a rising edge transition 824 must have occurred. That is, the output from AND gate 816 goes high and the output from AND gate 818 goes low, thereby indicating that the edge transition state for the register bank 800 is a rising edge transition not a falling edge transition. If the circuit 812 determines that the transition from the 0 degree phase point to the 360 degree phase point is a logic high to logic low, and the falling edge transition occurs and the output of AND gate 816 goes low and the output of AND gate 818 goes high.

Figure 9:
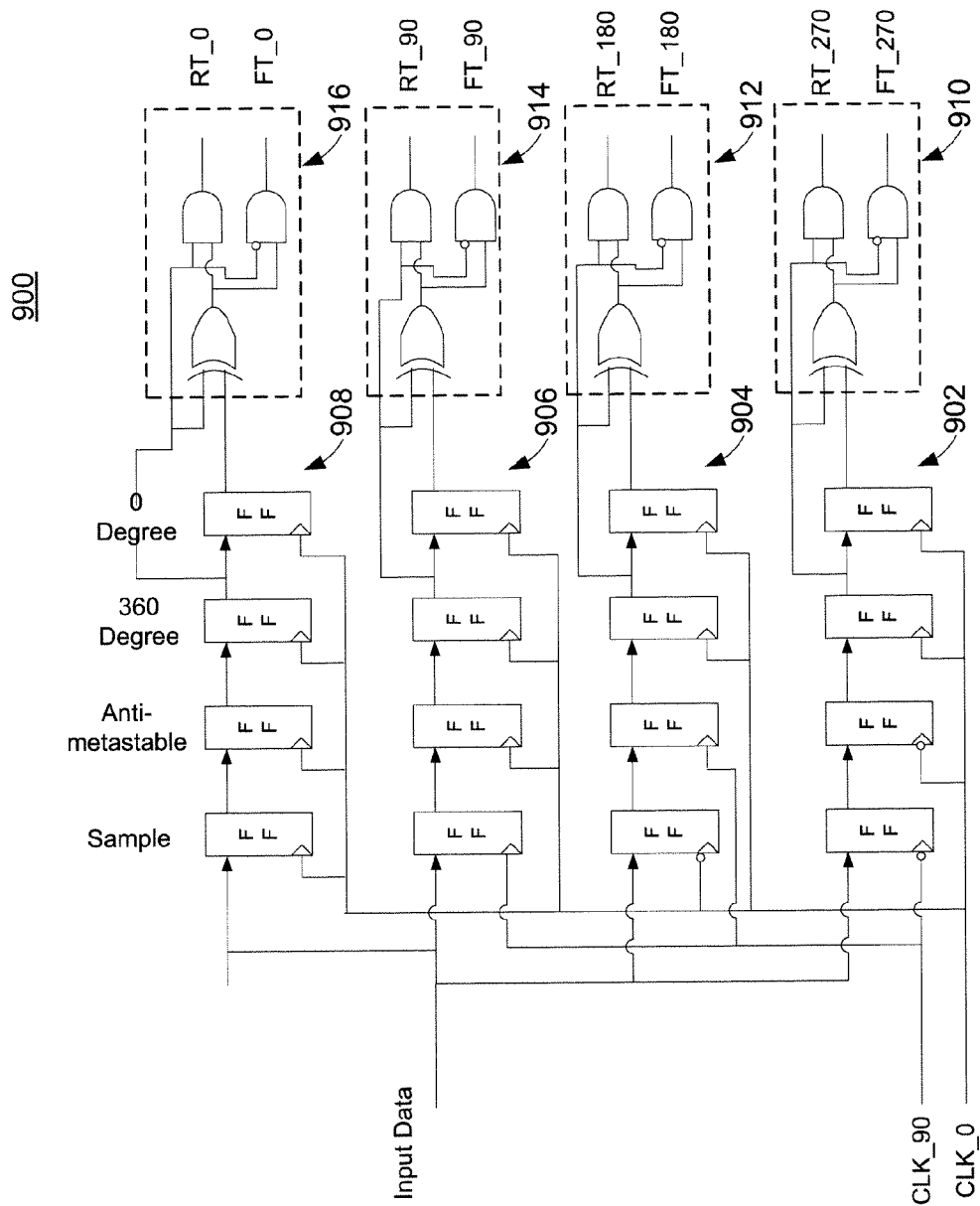
FIG. 9 is a block diagram of a plurality of parallel register banks each receiving the upstream transmission and coupled to a plurality of edge detection circuits.

FIG. 9 illustrates a data recovery circuit 900 that includes a series of register banks 902-908 each coupled to corresponding data transition and phase detection circuits 910-916, where each register bank and detection circuit pair produces a different edge transition state for a phase shifted clock signal. A non-phase adjusted, or primary, clock signal (CLK_0) is coupled to the register banks 902-908 as shown, as is a 90 degree phase shifted clock signal (CLK_90). The first register bank and circuit pair (908 and 916) produces an edge transition state for a 0 degree phase shift, the second pair (906 and 914) for a 90 degree phase shift, the third pair (904 and 912) for a 180 degree phase shift, and the fourth pair (902 and 910) for a 270 degree phase shift, which values are compared to a truth table, as discussed above. A rising edge (R) results from RT_=1 and FT_=0 and a falling edge (F) results from RT_=0 and FT_=1.

While each of the examples in FIGS. 6-9 pertain to a particular clock signal, such as one of the GPON supported upstream transmission data rates, an OLT in a GPON network may receive an upstream transmission containing bursts of different data rates. For example, each ONU and ONT may transmit its upstream burst at a different data rate. To allow the OLT to recover the overhead and payload from any ONU/ONT, an OLT may include a plurality of data recovery circuits each one simultaneously oversampling the input data at one of the allotted upstream transmission frequencies.

Figure 10:
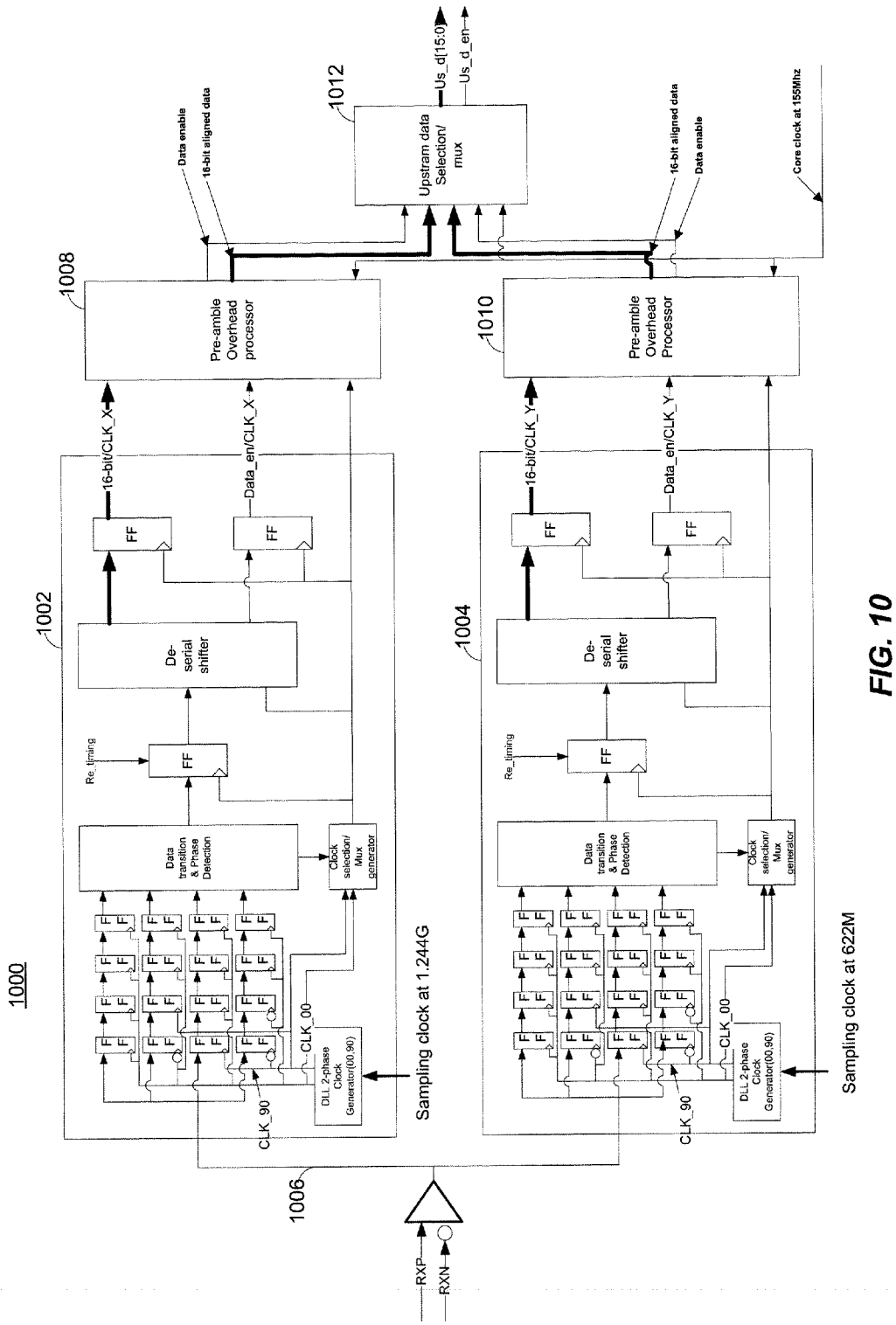
FIG. 10 is a block diagram of multiple data rate recovery circuits, similar to that of FIG. 6, that are operating simultaneously at different clock rates.

FIG. 10 shows an example circuit 1000 having two data rate recovery circuits 1002, 1004 similar to those shown in FIGS. 6 and 9. The circuits 1002 and 1004 each oversample an upstream transmission on line 1006 to determine an optimal sampling point. Each circuit 1002 and 1004 operates at a different clock rate in determining the optimal sample point. In the illustrated example, the circuit 1002 samples the upstream transmission using a clock signal CLK at a first clock rate of 1.224 Gb/s, and the circuit 1004 samples the upstream transmission using a clock signal CLK at a second clock rate of 622 Mb/s.

The data rate recovery circuit 1002 provides a 16 bit receiver clock signal (CLK_X) and a data enable signal (Data_en) at the optimal sampling point using CLK_X to a preamble overhead processor 1008 that processes the overhead of the upstream transmission at a data rate of CLK_X (e.g., 1.244 Gb/s). Simultaneously, the data rate recovery circuit 1004 provides a 16 bit receiver clock signal (CLK_Y) and a data enable signal (Data_en) sampled at the optimal sampling point using CLK_Y to a preamble overhead processor 1010 for processing the same overhead but at a data rate of CLK_Y (e.g., 622 Mb/s). While two data rate recovery circuits 1002, 1004 are shown, it will be appreciated that in an OLT configuration in which all four possible GPON upstream burst transmission data rates are supported, the OLT would include four data rate recovery circuits all operating simultaneously and in parallel. If additional data rates are supported than even further data rate recovery circuits could be used.

By operating the circuits 1002 and 1004 (and any others) operating in parallel, an OLT is able to oversample each burst of the upstream transmission at all possible data rates simultaneously to thereby reduce latency in the OLT. The output of each preamble overhead processor 1008, 1010 (along with any other preamble overhead processors for data rate recovery circuits not shown) is coupled to an upstream data selection/multiplexer circuit 1012, which analyzes the upstream transmissions from each of the processors 1008, 1010 and determines which one corresponds to the data rate of the original upstream burst transmission from the ONU/ONT. The 16 bit aligned data and a data enable signal are provided by each processor 1008, 1010 to the upstream data selection/multiplexer circuit 1012, which selects the appropriate 16 bit aligned data (at the originating data rate and sampled at the optimal sampling point) for transmission to the rest of the receiver (Us_d), e.g., the rest of receiver 504 and which selects the corresponding data enable for transmission to the rest of the receiver (Us_d_en). In the illustrated example, the processors 1008, 1010 are coupled to respective clock selection/multiplexer generators in the data rate recovery circuits 1002, 1004, respectively and are coupled to receive a core clock signal of the OLT.

The circuit 1000 illustrates an example of automatic detection and selection of the data rate for an incoming upstream transmission, where three are two or more sampling logic circuits operating at different fixed frequencies. After serial-to-parallel conversion, the upstream preamble (overhead) pattern of the data can be confirmed by the circuit 1000. For robustness and performance needs, as shown two or three independent sampling circuits and preamble search modules operate in parallel, although if logic size is a concern then only a single preamble (overhead) processor module may be used in place of using multiple modules by having each data rate recovery circuit coupled thereto. In addition to or in lieu of the automatic selection, data rate detection may occur from a manual fixed condition, in which an operator manually assigns the upstream data rate when the ONU or ONT in installed and stores this information in the OLT register. When ranging the ONU or ONT or during normal upstream transmissions during the allotted bandwidth window, the OLT will know the correct data rate and corresponding select the particular data rate recovery circuit corresponding to the data rate, while the data rate recovery circuit will identify the optimal sampling point for data reception, using the techniques discussed above.

Various techniques are discussed for achieving parallel phase detection for oversampling data recovery and phase tracking data recovery. Oversampling data recovery does not require the local oscillator to have phase synchronization with the data. In order to extract phase information, the input data is oversampled at a minimum of three times the data rate, i.e., 4 times per cycle. Higher oversampling rates may be used but as the oversampling ratio increases the signal-to-noise ratio (SNR) increases, and this reduces the phase quantization error. Also, although achievable, with larger numbers of sampling circuits, the input capacitance may increase and limit data bandwidth.

The various blocks, operations, and techniques described above may be implemented in hardware, firmware, software, or any combination of hardware, firmware, and/or software. When implemented in software, the software may be stored in any computer readable memory such as on a magnetic disk, an optical disk, or other storage medium, in a RAM or ROM or flash memory of a computer, processor, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, a wireless communication channel, the Internet, etc. (which are viewed as being the same as or interchangeable with providing such software via a transportable storage medium). When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

What is claimed is:

1. A method for recovering a data rate of an upstream transmission having rising edge transitions and falling edge transitions, the method comprising:
   a) providing the upstream transmission to a plurality of register banks, each register bank to oversample the upstream transmission at a different phase offset of a clock signal;
   b) determining an edge transition state for each of the register banks, each edge transition state corresponding to either a rising edge transition or a falling edge transition in the upstream transmission over a clock cycle;
   c) analyzing the edge transition states of the register banks to determine a sampling point of the clock signal for sampling the upstream transmission and to identify one of the plurality of register banks as corresponding to the determined sampling point,
   wherein the upstream transmission comprises a plurality of upstream burst transmissions each having a header and a payload and each transmitting at a different data rate, and the method further comprises;
   performing a)-c) with the clock signal at a first clock rate; and
   simultaneously performing a)-c) with the clock signal at a second clock rate different than the first clock rate.

2. The method of claim 1, further comprising providing to each of the plurality of register banks at least one of i) the clock signal and ii) a phase shifted clock signal 90 degrees out of phase with the clock signal.

3. The method of claim 2, further comprising providing a downstream clock signal to a clock generator to produce i) the clock signal and ii) the phase shifted clock signal.

4. The method of claim 1, wherein each register bank comprises a plurality of sequential flip flop registers.

5. The method of claim 1, wherein the plurality of upstream burst transmissions each comply with a gigabit passive optical network upstream burst transmission format.

6. The method of claim 1, further comprising
   providing an output from the identified register bank to a deserializer for deserializing the upstream transmission and producing i) a receiver clock signal and ii) a data enable signal.

7. A method for recovering a data rate for an upstream burst transmission transmitted on a passive optical network at any one of a plurality of data rates:
   a) providing the upstream burst transmission to a plurality of data rate recovery circuits, each data rate recovery circuit operating at a different clock rate and each data rate recovery circuit;
   i) oversampling the upstream burst transmission using multiple register banks each sampling the upstream burst transmission at a different sampling point,
   ii) in response to oversampling, identifying an optimal sampling point for the clock rate of the data rate recovery circuit and identifying the register bank producing the optimal sampling point, and
   iii) deserializing an output from the identified register bank to produce a deserialized upstream burst transmission from the data rate recovery circuit; and
   b) analyzing the deserialized upstream burst transmission from each of the data rate recovery circuits to identify the data rate for the upstream burst transmission; and
   providing to each of the data rate recovery circuits a different clock signal and phase shifted clock signal pair.

8. The method of claim 7, wherein each phase shifted clock signal is a 90 degree phase shifted clock signal.

9. The method of claim 7, further comprising directing each data rate recovery circuit to identify an edge transition state for each of the multiple register banks and to determine the optimal sampling point from the edge transition states.

10. The method of claim 7, wherein there are multiple upstream burst transmissions each having a corresponding data rate.

11. The method of claim 10, further comprising performing a) and b) on each of upstream burst transmissions to determine the corresponding data rate for each of the multiple upstream burst transmissions.

12. The method of claim 11, wherein each of the multiple upstream burst transmissions has a different data rate.

13. The method of claim 11, further comprising simultaneously performing a) and b) on each of upstream burst transmissions.

14. An apparatus for identifying a data rate of an upstream transmission, the apparatus comprising:
   a first assembly comprising,
     a first clock signal generator capable of generating a first clock signal and a first phase shifted clock signal,
     a first plurality of register banks each capable of receiving at least one of the first clock signal and the first phase shifted clock signal to oversample the upstream transmission at a different phase offset of the clock signal, a first edge transition detection circuit having logic circuits to determine an edge transition state for each of the first plurality of register banks, and a first clock selection circuit coupled to the first edge transition detection circuit to identify a first optimal sampling point based on the edge transition states from the first plurality of register banks and to identify which of the first plurality of register banks samples the upstream transmission at the first optimal sampling point; and a second assembly comprising, a second clock signal generator capable of generating a second clock signal and a second phase shifted clock signal, where the rate of the second clock signal is different than the rate of the first clock signal, a second plurality of register banks each capable of receiving at least one of the second clock signal and the second phase shifted clock signal to oversample the upstream transmission at a different phase offset of the clock signal, a second edge transition detection circuit having logic circuits to determine an edge transition state for each of the second plurality of register banks, and a second clock selection circuit coupled to the second edge transition detection circuit to identify a second optimal sampling point based on the edge transition states from the second plurality of register banks and to identify which of the second plurality of resister banks samples the upstream transmission at the second the optimal sampling point.

15. The apparatus of claim 14, wherein the first clock selection circuit is configured to compare the edge transition states from the first plurality of register banks to a table indicating possible optimal sampling points.

16. The apparatus of claim 14, further comprising: a first overhead processor coupled to the first edge transition detection circuit to process overhead data in the upstream transmission at the first optimal sampling point; and a second overhead processor coupled to the second edge transition detection circuit to process overhead data in the upstream transmission at the second optimal sampling point.

17. An optical network device for identifying data rates of burst transmissions transmitted in an optical network, the optical network device comprising:

an optoelectronic receiver to receive the burst transmissions; and data rate recovery circuits to receive the burst transmissions from the optoelectronic receiver, wherein each data rate recovery circuit comprises a first circuit having a plurality of registers to oversample the burst transmissions at different phase points of a clock signal, a second circuit to determine edge transition states between the different phase points of the clock signal, and a third circuit to identify an optimal sampling point based on the edge transition states, wherein each data rate recovery circuit samples the burst transmissions at a different clock rate, wherein each data rate recovery circuit further comprises a clock generator circuit to i) receive a downstream clock signal of the optical network device, ii) produce the clock signal for the data rate recovery circuit, and iii) produce a phase shifted clock signal for the data rate recovery circuit.

18. The optical network device of claim 17, wherein the third circuit is to compare the edge transition states to a table indicating possible optimal sampling points to identify the optimal sampling point.

19. The optical network device of claim 17, further comprising an upstream data selection circuit coupled to each of the data rate recovery circuits to identify the data rate recovery circuit sampling the burst transmissions at an original data rate of the burst transmissions.

20. The optical network device of claim 19, further comprising overhead processors each coupled to the second circuit of a corresponding data rate recovery circuit for processing overhead fields in the burst transmissions, wherein the upstream data selection circuit is coupled to each of the overhead processors for identifying the data rate recovery circuit sampling the burst transmissions at the original data rate.

* * * * *